(12) United States Patent  
Nagayama

(10) Patent No.: US 6,439,818 B1  
(45) Date of Patent: Aug. 27, 2002

(54) NUT AND INTERMEDIATE PRODUCT THEREFOR

(75) Inventor: Yutaka Nagayama, Kishiwada (JP)

(73) Assignee: Nagayama Electronic Industry Co., Ltd., Kokawa (JP)

( * ) Notice: Subject to any disclaimer, the term of this patent is extended or adjusted under 35 U.S.C. 154(b) by 0 days.

(21) Appl. No.: 09/318,397

(22) Filed: May 25, 1999

(30) Foreign Application Priority Data

Jun. 3, 1998 (JP) .......................................... 10-154424

(51) Int. Cl.⁷ ................................................ F16B 37/16
(52) U.S. Cl. ..................................... 411/436; 470/25
(58) Field of Search ................................ 411/436, 427, 411/386, 270, 277, 411; 470/18, 25

(56) References Cited

U.S. PATENT DOCUMENTS

| | | | | |
|---|---|---|---|---|
| 2,190,174 A | * | 2/1940 | MacDonald | 411/436 |
| 2,460,721 A | * | 2/1949 | Thompson | 220/288 |
| 2,720,905 A | * | 10/1955 | Bessom | 411/277 |
| 3,069,960 A | * | 12/1962 | Baubles | 411/411 |
| 3,412,593 A | * | 11/1968 | Price | 411/368 |
| 3,513,684 A | * | 5/1970 | Price | 72/340 |
| 3,996,834 A | * | 12/1976 | Reynolds | 411/436 |
| 4,798,507 A | * | 1/1989 | Olah | 411/175 |
| 4,915,559 A | * | 4/1990 | Wheeler | 411/366 |
| 5,039,265 A | * | 8/1991 | Rath | 411/366 |
| 5,348,432 A | | 9/1994 | Nagayama | |
| 5,503,596 A | | 4/1996 | Nagayama | |
| 5,618,144 A | | 4/1997 | Leistner | |
| 5,626,521 A | * | 5/1997 | Hirai | 470/25 |
| 5,632,584 A | * | 5/1997 | Acevedo | 411/182 |
| 5,827,027 A | * | 10/1998 | Wakabayashi | 411/283 |
| 6,004,087 A | * | 12/1999 | Muller | 411/180 |

* cited by examiner

Primary Examiner—Gary Estremsky  
(74) Attorney, Agent, or Firm—W. F. Fasse; W. G. Fasse

(57) ABSTRACT

A nut consists of integral metal material and has a female screw threading; screw thread formed with a rolled tap in a screw hole that opens substantially perpendicularly to an end surface of one end of the nu. A concave lead-in is located at an opening end of the screw hole and has a shape including a concave curved portion and a linear tapered portion that are continuous with each other, and extend along the overall periphery of the opening end of the hole. Due to the special concave lead-in, the first thread formed by the rolled tap adjacent to the concave lead-in will not have a concave groove along its crest, although subsequent threads have such a concave groove along the thread crest as a characteristic of thread formation with the rolled tap. Such a thread structure avoids cross-threading when a bolt is engaged in the nut.

8 Claims, 16 Drawing Sheets

NUT AND INTERMEDIATE PRODUCT THEREFOR

BACKGROUND OF THE INVENTION

1. Field of the Invention

The present invention relates to a nut and an intermediate product therefor, and more particularly, it relates to the structures of a nut having a concave lead-in shape suitable for internal threading with a rolled tap and an intermediate product therefor.

2. Description of the Prior Art

In general, a nut is internally threaded with the so-called cutting tap 52 shown in FIGS. 13A and 13B. In this threading with the cutting tap 52, the inner peripheral surface of a prepared hole of an unthreaded intermediate product 51 for a nut is cut to form roots of a female screw threading while discharging chips through grooves 52a of the cutting tap 52 shown in FIG. 13A. In such internal threading with the cutting tap 52, the crest diameter of the worked female screw threading coincides with the inner diameter d of the unthreaded prepared hole and hence the accuracy of the female screw threading shape can be relatively readily ensured. However, parts of the chips tend to remain in the worked female screw threading to bite into a male screw engaging with the female screw threading and disadvantageously hinder proper fastening.

In order to solve such a problem, a nut is increasingly internally threaded with a rolled tap causing no chips. FIGS. 14A and 14B show a rolled tap 53 threading an intermediate product 51 for a nut. In such internal threading with a rolled tap 53, a female screw threading is formed not by cutting but by plastic working. In other words, the inner peripheral surface of a prepared hole of the intermediate product 51 for a nut is depressed for forming roots of the female screw threading while the material extruded from the depressed portions is raised to form crests. The crest diameter of the worked female screw threading is smaller than the inner diameter d of the prepared hole of the unthreaded intermediate product 51.

However, such conventional internal threading of the nut with a rolled tap has the following problem:

In general, an internally threaded screw hole of a nut is provided on its opening end with a tapered concave lead-in, called a countersink in general, in order to guide the forward end of a bolt engaging with the nut or facilitating discharge of chips resulting from internal threading with a tap. FIG. 15A shows an unthreaded intermediate product 131 for a nut provided with a concave lead-in 31a having such a shape, to be internally threaded with a rolled tap 53 from the side of the lead thread 31a. As a consequence of internal threading with the rolled tap 53, a nut 31 provided with a female screw threading having a concave portion CP1 or CP2 in each thread is formed as shown in FIG. 15B. When the rolled tap 53 is screwed into the intermediate product 131 from the side of the concave lead-in 31a, the material is plastically deformed along thick arrows appearing in FIG. 16, showing a detailed area enclosed with a circle XVI in FIG. 15B in an enlarged manner, in the vicinity of the concave lead-in 31a. Thus, roots of the rolled tap 53 cannot be completely filled up with the material but crests of the threads of the formed female screw threading are disadvantageously depressed with concave portions or depression CP1 and CP2. In particular, the root of the rolled tap 53 for forming a thread 31b adjacent to the concave lead-in 31a cannot be sufficiently filled up with the material in general due to the tapered shape of the concave lead-in 31a. Thus, the thread 31b has a lower height a larger depression or concave portion CP1 than the remaining threads.

When a bolt 32 is to engage with the nut 31 internally threaded with the rolled tap 53 in the aforementioned manner from the side of the concave lead-in 31a as shown in FIG. 17A, a thread on the forward end of the bolt 32 hits against the depression on the crest of the thread 31b of the nut 31 adjacent to the concave lead-in 31a to cause the so-called cross-thread, as shown in a part enclosed with a circle A in FIG. 17B. Consequently, the bolt 32 incorrectly engages with the nut 31, to result in an improper fastening state.

SUMMARY OF THE INVENTION

An object of the present invention is to provide a nut having a concave lead-in shape causing no cross-thread in engagement with a bolt also when the is internally threaded with a rolled tap.

In order to attain the aforementioned object, a nut according to a first aspect of the present invention consists of integral metal material and has a female screw threading formed in a screw hole opening substantially perpendicularly to an end surface of one end, and a concave lead-in defining an opening end of the screw hole for the end surface has a concavely depressed shape along the overall periphery thereof.

In a preferred embodiment, the concave lead-in includes a concave bent or curved portion in an arbitrary longitudinal section including the central axis of the screw hole. The concave lead-in preferably has such a shape that the concave bent portion is continuously combined with a linear tapered portion, and in this case, the concave bent portion further preferably starts from the inner peripheral side of the opening end to be continuous with the linear tapered portion on an outer prescribed position.

A nut according to a second aspect of the present invention comprises a shaft portion and a flange portion outwardly extending from a first end of the shaft portion, consisting of integral metal material. The shaft portion is in the form of a hollow cylinder, has a portion slated or adopted for caulking in a second end opposite to the first end and is formed with a female screw threading on the inner peripheral surface excluding the portion slated for caulking. The portion slated for caulking has an inner diameter larger than that of the portion formed with the female screw threading, and a concave lead-in defining an end of the portion of the shaft portion formed with the female screw threading adjacent to the portion slated for caulking has a concavely depressed shape along the overall periphery. In this nut, the present invention is applied to the so-called rivet type tee nut having a predeterminate caulked portion, and the shape of the portion formed with the female screw threading is common to the nut according to the first aspect of the present invention.

The present invention includes an unthreaded intermediate product for a nut consisting of integral metal material and having a screw hole opening substantially perpendicularly to an end surface of one end, slated for internal threading with a rolled tap at least in a prescribed region, and a concave lead-in defining an end of the prescribed region of the screw hole slated for internal threading has a concavely depressed shape along the overall periphery.

The nut according to the first or second aspect of the present invention is formed by working a female screw threading in the screw hole of such an intermediate product for a nut with a rolled tap. In the intermediate product for a nut according to the present invention, the concavely depressed shape of the concave lead-in is preferably so formed that the crest of a thread of the female screw threading adjacent to the concave lead-in has no concave groove but a convex shape and particularly a line edge crest formed along an intersection of the two sloping flanks of the screw thread ridge. Consequently, no concave groove is formed on the crest of the thread of the female screw adjacent to the lead thread when the intermediate product is threaded with the rolled tap, whereby it is possible to prevent such an inconvenient phenomenon that a thread on the forward end of a bolt engaging with the nut hits against the thread of the female screw threading to cause cross-thread. Further, the nut maintains such a characteristic of the countersink that the diameter of the concave lead-in enlarges toward the opening end, whereby the female screw threading can be worked without damaging the function of the countersink facilitating discharge of chips resulting from internal threading with the tap.

The concavely depressed portion of the concave lead-in is shaped as a concave bent or curved portion, not to damage another function of the conventional tapered countersink properly guiding the forward end of the bolt engaging with the nut for automatically aligning the central axes of the nut and the bolt. Even if the bolt for engagement is inserted into the nut in a slightly inclined state, the central axes of the nut and the bolt are automatically aligned due to the guiding function of the concave lead-in, so that the nut and the bolt properly engage with each other.

The nut according to the present invention is also applicable to the so-called rivet type tee nut in which a predeterminate caulked portion of a shaft portion has an inner diameter larger than a first inner diameter and a uniform outer diameter substantially identical to a first outer diameter or another rivet type tee nut in which a predeterminate caulked portion of a shaft portion has an inner diameter larger than a first inner diameter and an outer diameter larger than a first outer diameter.

Further, the nut according to the present invention is also applicable to the so-called rivet type tee nut in which a predeterminate caulked portion of a shaft portion has an inner diameter larger than that of a portion formed with a female screw threading and is formed to be smaller in thickness than the portion formed with the female screw threading, or another rivet type tee nut in which a predeterminate caulked portion of a shaft portion has an inner diameter larger than that of a portion formed with a female screw threading and an outer diameter larger than that of the portion formed with the female screw threading, for example.

When applying the nut according to the present invention to a tee nut, the shaft portion preferably has a step portion in the region formed with the female screw threading, so that a region closer to the flange portion with reference to the step portion has a shape larger in inner and outer diameters than a region on an end opposite to the flange portion. The nut having such a step portion is formed by internally threading an intermediate product for a nut having a step portion with a rolled tap or the like. When the shaft portion of the unthreaded intermediate product for a nut has such a step portion, allowance for working accuracy can be attained by working only the screw hole of the prescribed region including the concave lead-in in the female screw threading forming region into a shape maintaining necessary accuracy while rendering the remaining region slightly larger in inner diameter than the prescribed region so that a female screw threading shape defined in a standard such as JIS can be accurately formed. It can be said that such a step portion is effective also for working the concave lead-in in the present invention in high accuracy.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5B is a sectional view showing such a state that a thread on the forward end of the bolt starts to engage with a portion of a female screw threading of the nut adjacent to a concave lead-in;

FIG. 6B is a sectional view showing a state of forming a linear tapered portion with another punch after working the concave bent portion of the concave lead-in;

FIG. 17B is a sectional view showing the so-called cross-thread caused by a thread on the forward end of the bolt hitting a concave portion of a first thread of the female screw threading when the forward end of the bolt starts to engage with a portion of the female screw threading of the nut adjacent to a concave lead-in.

DESCRIPTION OF THE PREFERRED EMBODIMENTS

Embodiments of the present invention are now described with reference to the drawings.

(First Embodiment)

Figure 1A:
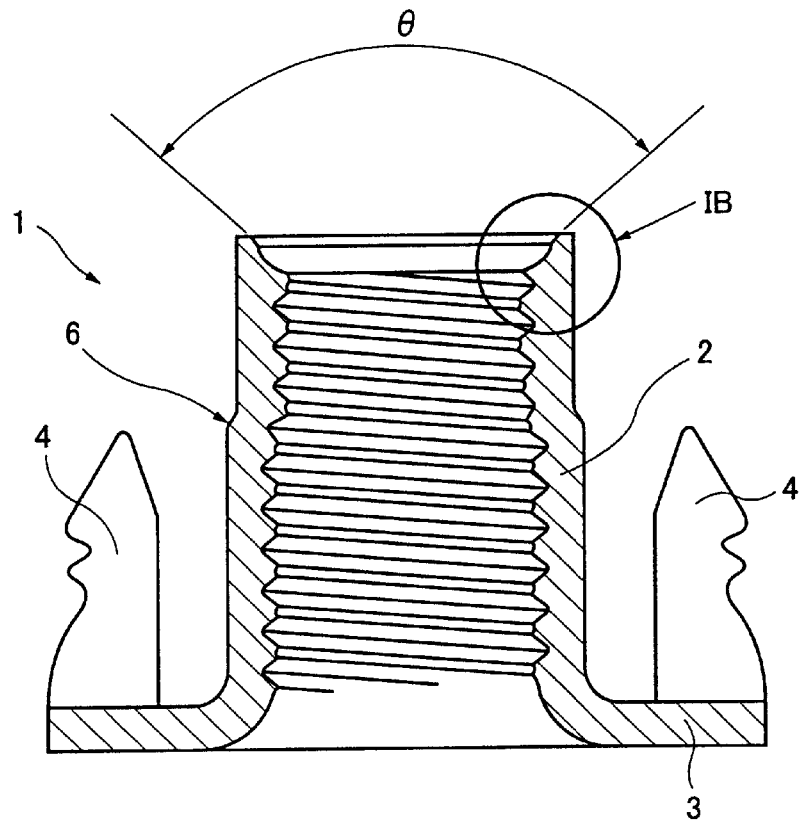
FIG. 1A illustrates a central longitudinal section of a nut according to a first embodiment of the present invention.
Figure 1B:
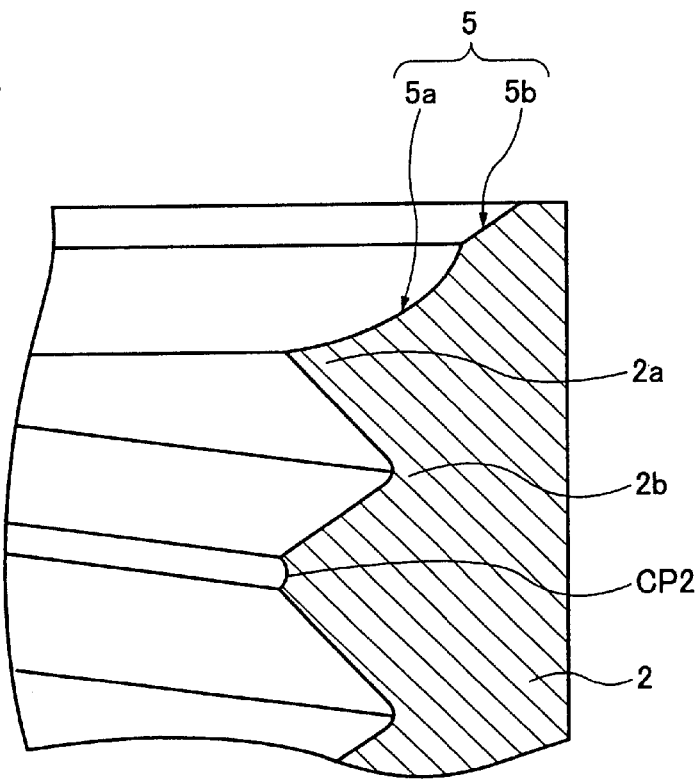
FIG. 1B is a partially enlarged sectional view showing a part enclosed with a circle 1B in FIG. 1A in an enlarged manner.
Figure 2:
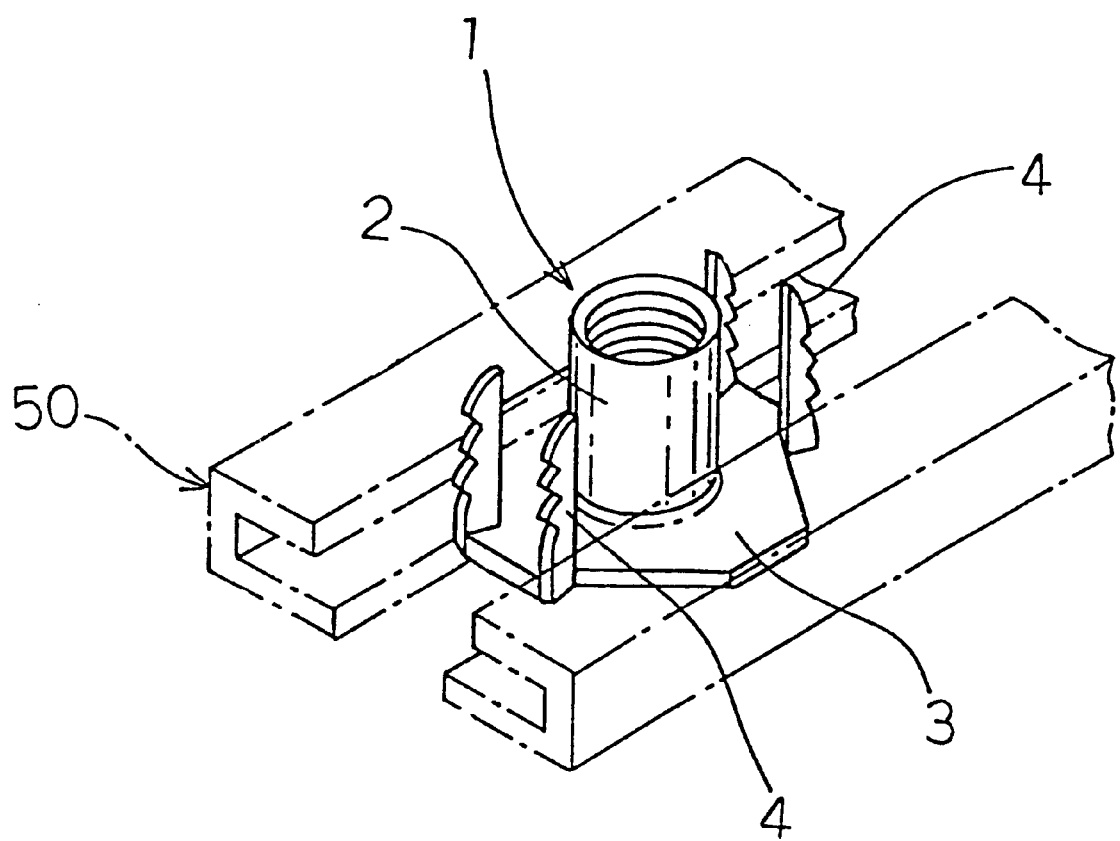
FIG. 2 is a perspective view showing the nut appealing in FIGS. 1A and 1B carried along a feed track.

A first embodiment of the present invention is now described with reference to FIGS. 1A to 6B. In the first embodiment, the present invention is applied to the so-called hopper feed tee nut provided with a flange portion 3 having pawls 4 on an end of a hollow cylindrical shaft portion 2, which can be automatically fed along feed tracks 50 as shown in FIG. 2. The feature of this nut 1 resides in the shape of a concave lead-in 5 thereof, i.e., the shape of a starting end of a female screw threading or portion on the upper end of the shaft portion 2 shown in FIG. 1A. As most clearly understood from FIG. 1B showing a part enclosed with a circle IB in FIG. 1A in an enlarged manner, the concave lead-in 5 includes a concave bent portion 5a on the inner peripheral side and a tapered portion 5b continuous with the bent portion 5a on the outer peripheral side. The concave bent portion 5a is generally set in a substantially arcuate shape.

Figure 3A:
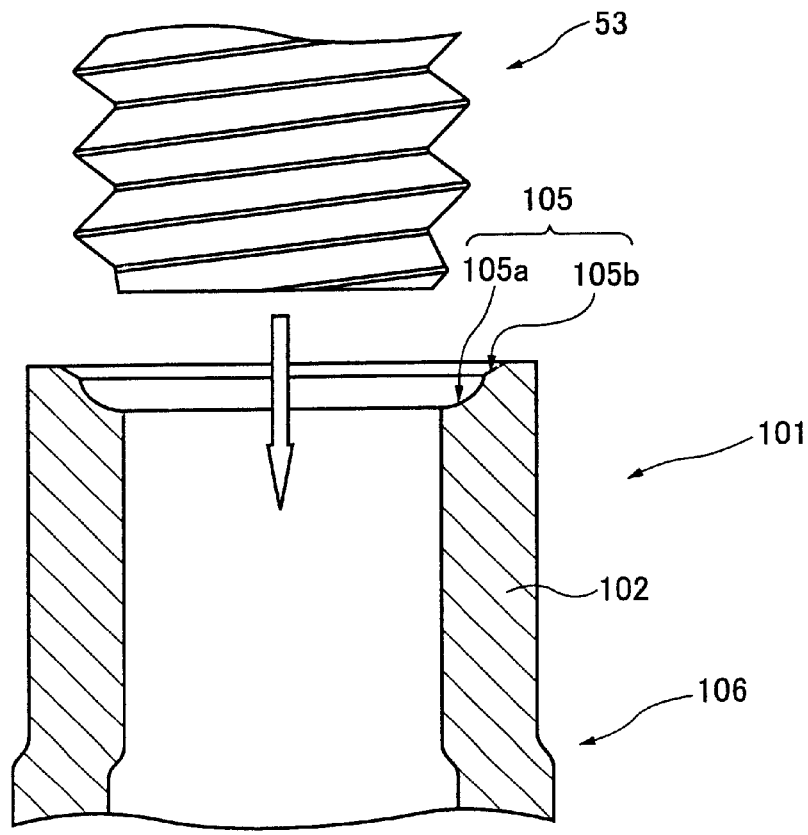
FIG. 3A is a sectional view showing an intermediate product for the nut according to the first embodiment of the present invention to be internally threaded with a rolled tap.

In order to form a female screw threading in the nut 1 having the aforementioned structure, a rolled tap 53 is screwed into an unthreaded intermediate product 101 for the nut 1 shown in FIG. 3A from the side of the upper-end thereof, i.e., the side of the concave lead-in 5. A concave lead-in 105 of the intermediate product 101 for the nut 1 includes a substantially arcuate concave bent portion 105a provided on the inner periphery of the upper end of a hollow cylindrical shaft portion 102 in an arbitrary longitudinal section including the central axis of the shaft portion 102 and a linear tapered portion 105b continuous with the concave bent portion 105a on the outer peripheral sides.

Figure 3B:
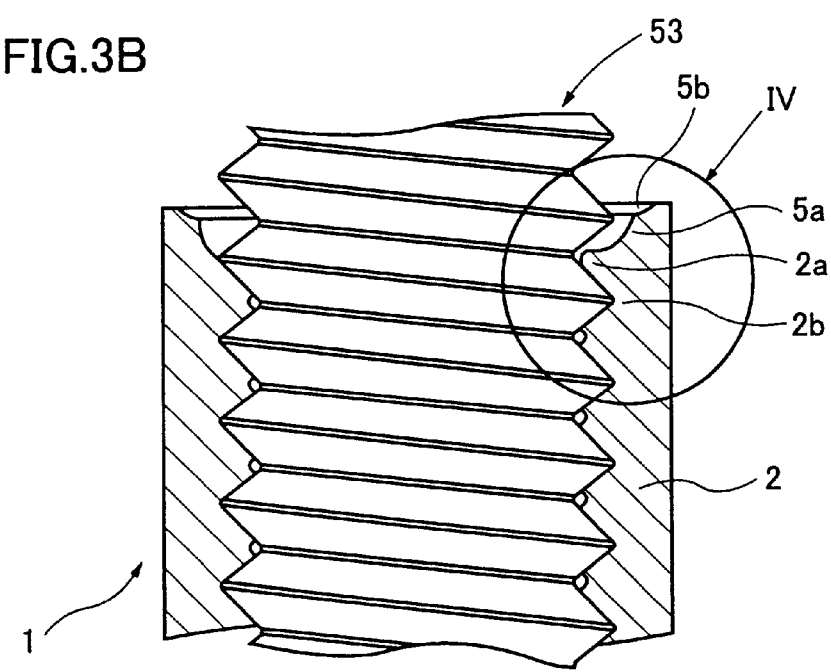
FIG. 3B is a sectional view showing the intermediate product in the process of internal threading with the rolled tap.
Figure 4:
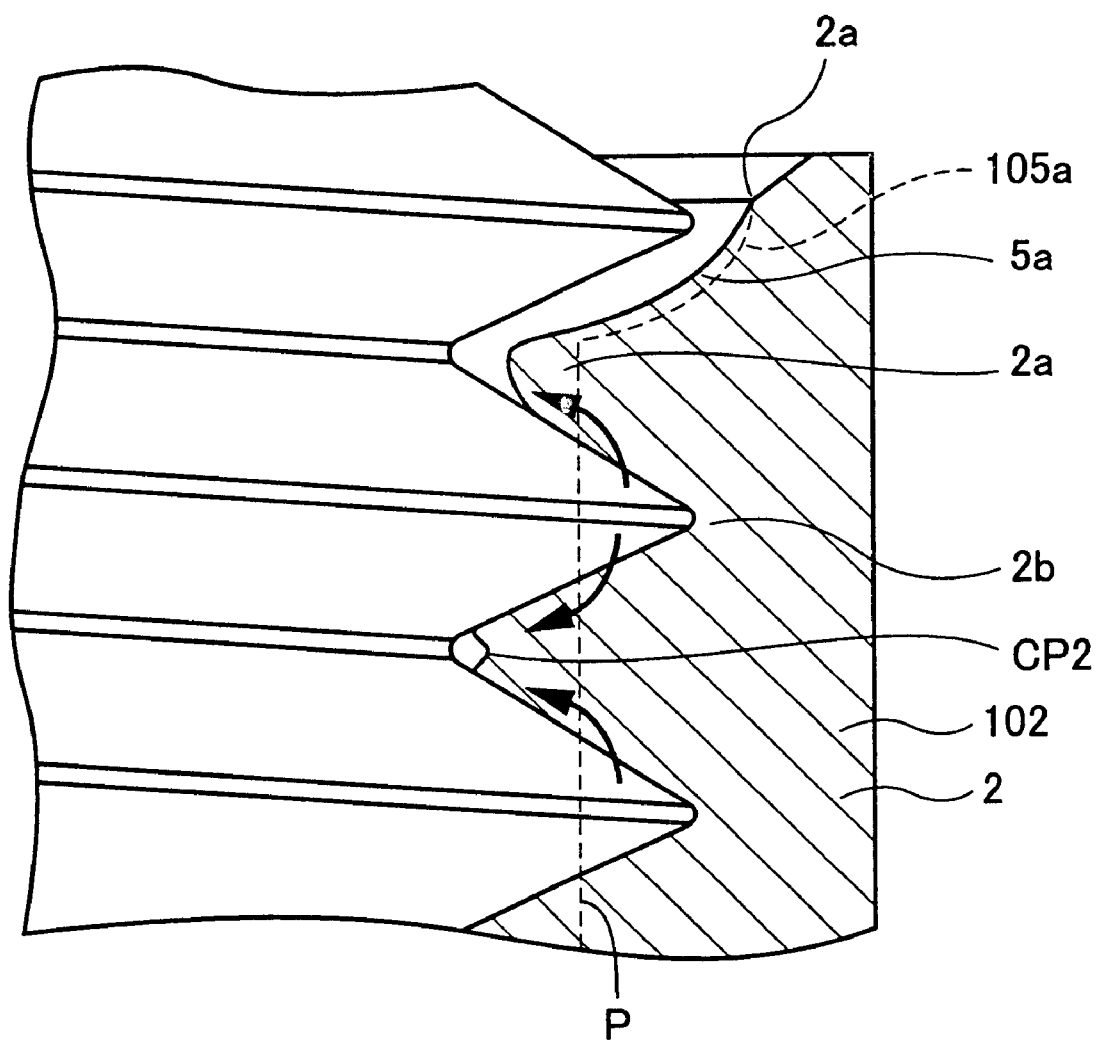
FIG. 4 is a partially enlarged sectional view showing a part enclosed with a circle IV in FIG. 3B, for illustrating flow of material caused by plastic deformation in the process of internal threading on the intermediate product for the nut according to the first embodiment of the present invention with the rolled tap.

The concave lead-in 105 has the aforementioned shape so that the shaft portion 2 of the nut 1 is provided with a female screw threading having a sectional shape shown in FIG. 3B when internal threading with the rolled tap 53 is completed. FIG. 4 illustrates a part enclosed with a circle IV FIG. 3B in an enlarged manner, to show flow of material caused by plastic deformation when the intermediate product 101 shown in FIG. 3A is internally threaded to obtain the nut 1 shown in FIG. 3B. As shown by thick arrows in FIGS. 4, the original inner periphery from and or roots 26 of the shaft portion 102 is depressed due to formation of the female screw so that the material fills up spaces for defining threads to cause this flow.

Figure 15A:
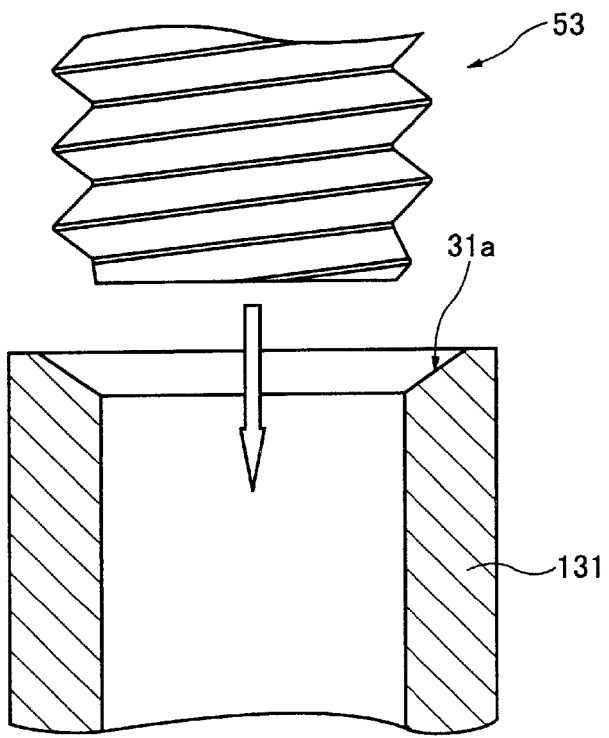
FIG. 15A is a sectional view showing an intermediate product for a conventional nut to be internally threaded with a rolled tap.
Figure 15B:
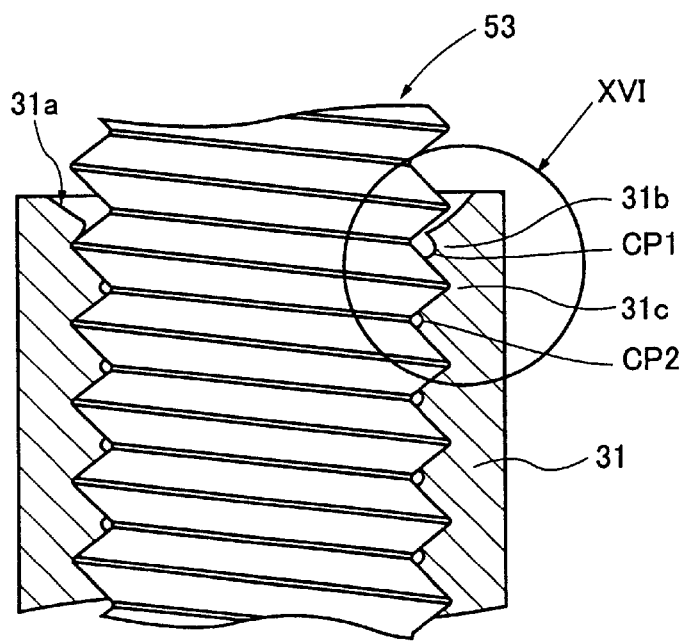
FIG. 15B is a sectional view showing the intermediate product in the process of internal threading with the rolled tap.
Figure 16:
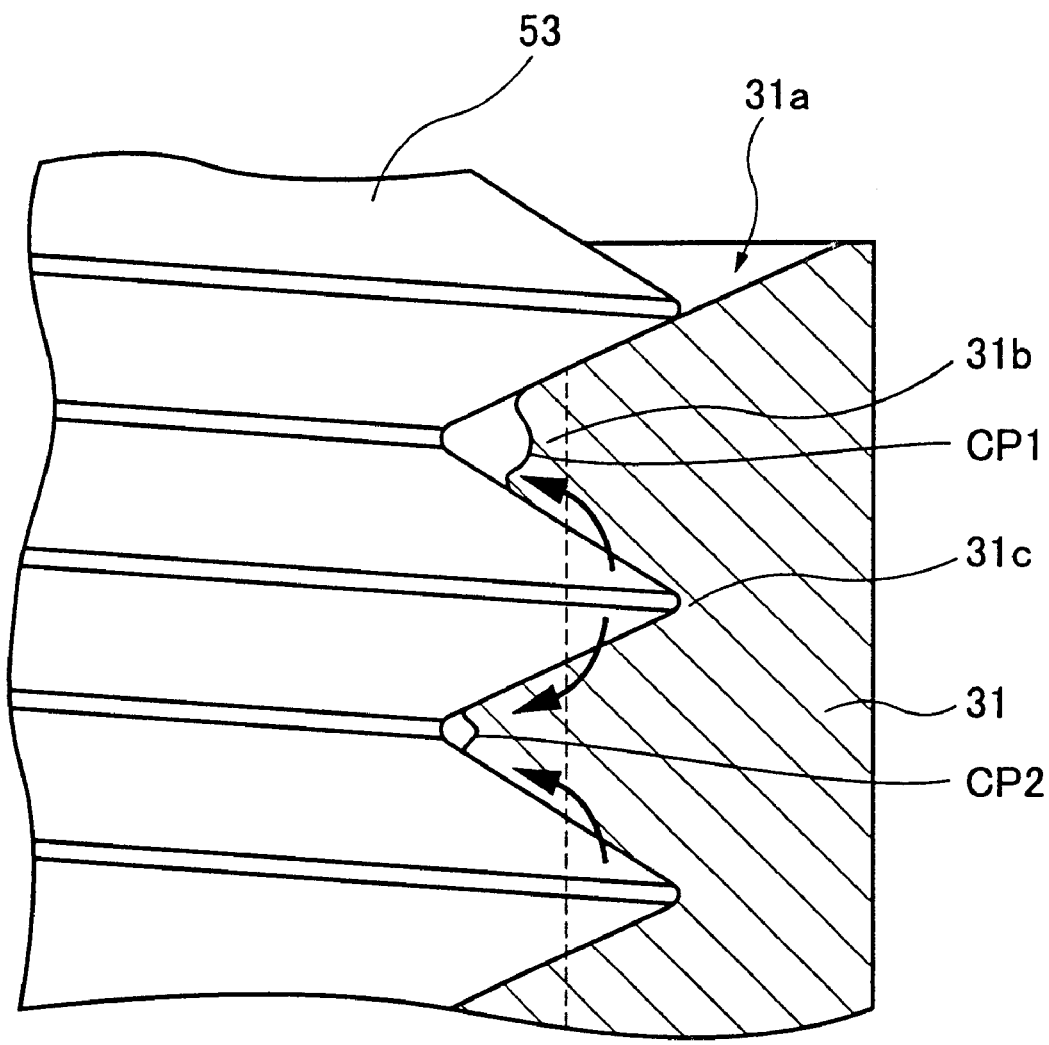
FIG. 16 is a partially enlarged sectional view showing a part enclosed with a circle XVI in FIG. 15B for illustrating flow of material caused by plastic deformation in the process of internal threading on the intermediate product for the conventional nut with the rolled tap.
Figure 17A:
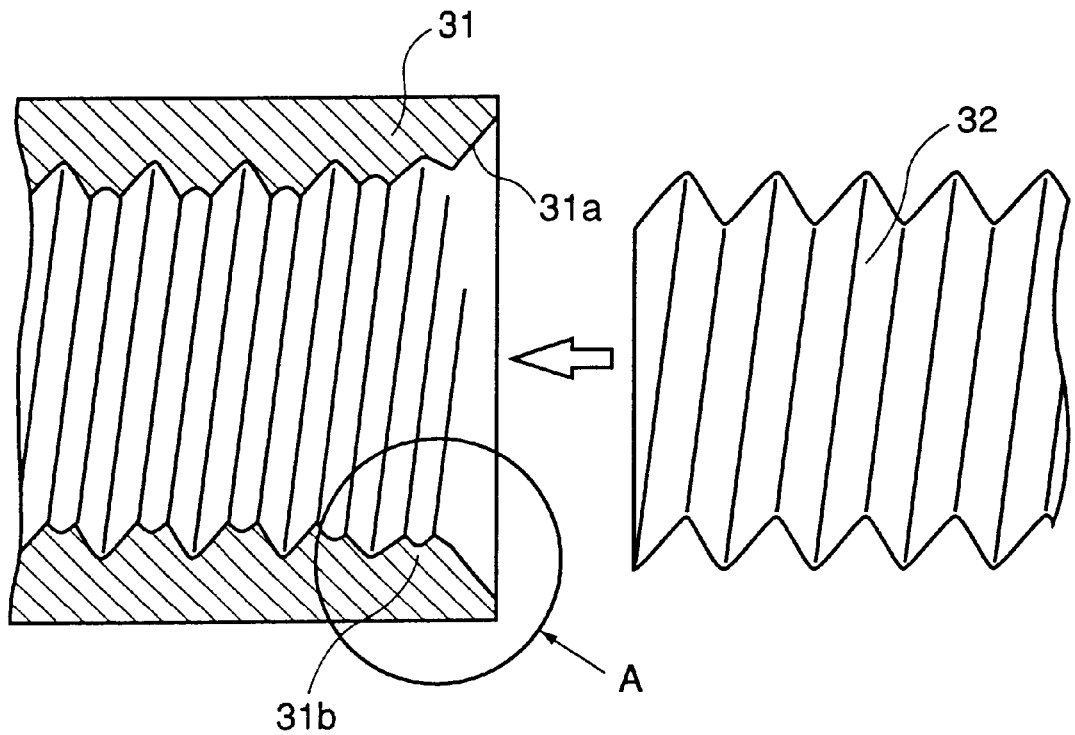
FIG. 17A is a sectional view showing the conventional nut for engaging with a bolt.
Figure 17B:
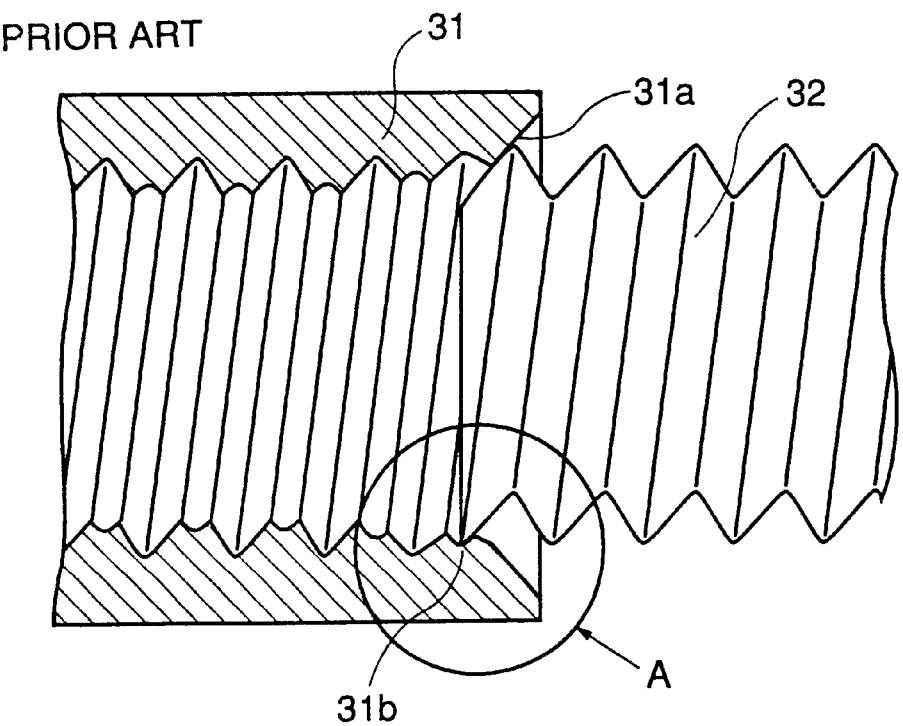

The intermediate product 101 for the nut 1 according to this embodiment corresponds to that prepared by substantially arcuately depressing the region close to the inner peripheral end of the concave lead-in 31a of the intermediate product 131 for the conventional nut shown in FIG. 15A, formed by only a linear tapered portion, thereby forming the concave bent portion 105a. The lead thread 105 of the intermediate product 101 has the concave bent portion 105a so that no concave part or concave groove is formed on a crest of a first thread 2a of the female screw threading adjacent to the concave lead-in of the completed nut 1 dissimilarly to the corresponding thread 31b of the intermediate product 131 for the conventional nut. In other words, the amount of depression of the concave bent portion 105a of the concave lead-in 105 of the intermediate product 101 and the ratios of the concave bent portion 105a and the linear tapered portion 105b are previously set so that no concave portion is formed on the first thread 2a of the female screw threading adjacent to the concave lead-in 105.

The linear tapered portions 5b and 105b are left on the outer peripheral ends of the concave lead-in 5 and 105 for smoothly guiding the forward end of the rolled tap 53 into a screw hole for internally threading the intermediate product 101 or guiding the forward end of a bolt for engaging with the nut 1 formed with the female screw threading into the screw hole. When the concave bent portion 105a must be largely formed, however, the concave bent portion 105a may be provided along the overall region of the concave lead-in 105 of the intermediate product 101 for the nut 1 with no linear tapered portion 105b. The angle of the linear tapered portions 5b and 105b, i.e., the angle denoted by θ in FIG. 1, is preferably set at 118° to 120° slightly smaller than the angle formed by the forward end of the rolled tap 53.

Figure 5A:
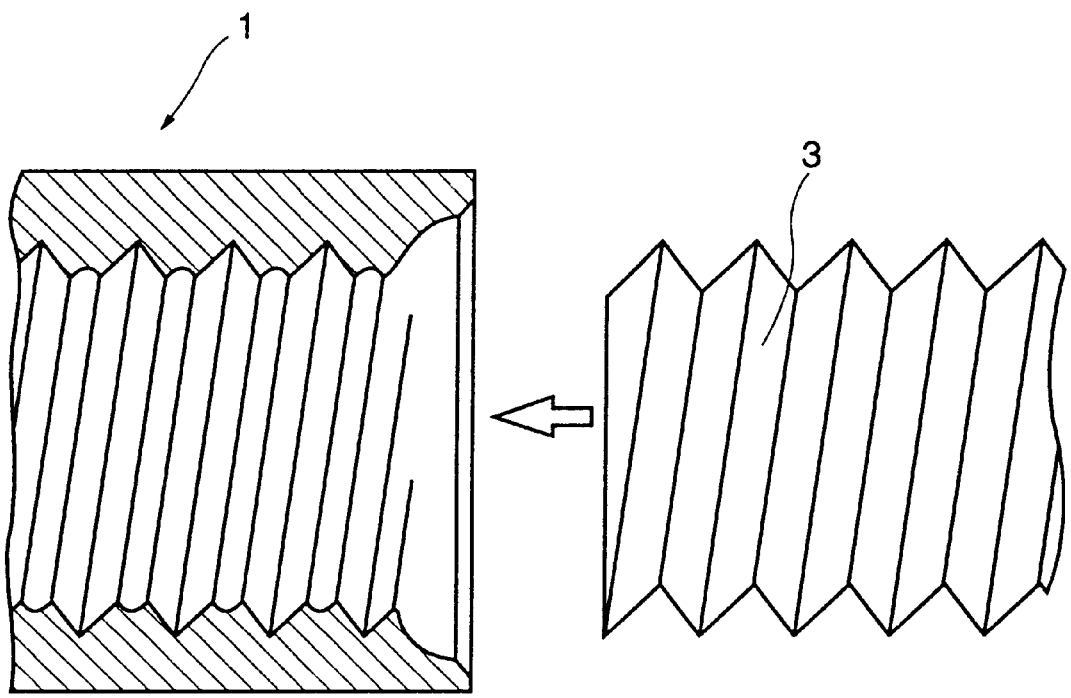
FIG. 5A is a sectional view showing the nut according to the first embodiment of the present invention to engage with a bolt.
Figure 5B:
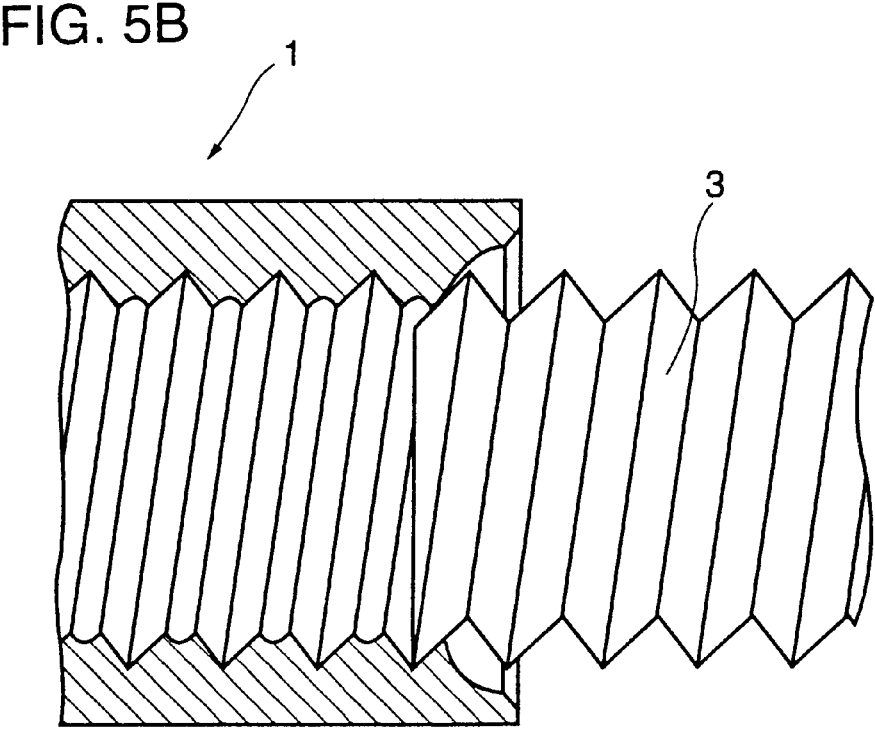

When a bolt 3 is inserted in the nut 1 according to the embodiment formed in the aforementioned manner as shown in FIGS. 5A and 5B, a thread on the forward end of the bolt 3 reliably engages with a first troush or root 2b of the female screw threading without hitting against the first thread 2a of the female screw threading having no concave part on its crust. Even if threads other than the thread 2a of the female screw threading adjacent to the concave lead-in 5 have concave parts CP2, therefore, crests of a male screw threading of the bolt 3 slide along the roots of the female screw threading of the nut 1 to be prevented from hitting against the concave parts, i.e., from cross threading.

Further, such a characteristic of the countersink is maintained that the diameter of the concave lead-in enlarges toward the opening end, whereby the female screw can be worked without damaging a function of the countersink facilitating discharge of chips resulting from internal threading with a tap. In addition, the concave lead-in 5 is shaped to define a substantially arcuate concave bent portion, not to damage another function of the conventional tapered countersink properly guiding the forward end of the bolt for engaging with the nut and automatically aligning the central axes of the nut and the bolt. Even if the bolt is inserted into the nut 1 in a slightly inclined state, the central axes of the nut 1 and the bolt are automatically aligned due to the guiding function of the concave lead-in 5, so that the nut 1 and the bolt properly engage with each other.

Figure 6A:
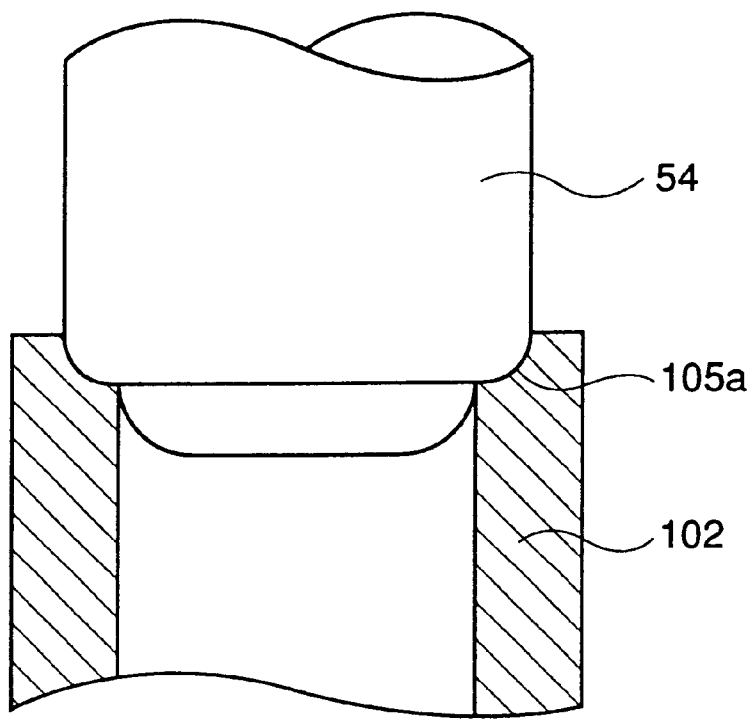
FIG. 6A is a sectional view showing a state of working a concave bent or curved portion of the concave lead-in with a punch having a prescribed shape in a press step of molding the intermediate product for the nut according to the first embodiment of the present invention.
Figure 6B:
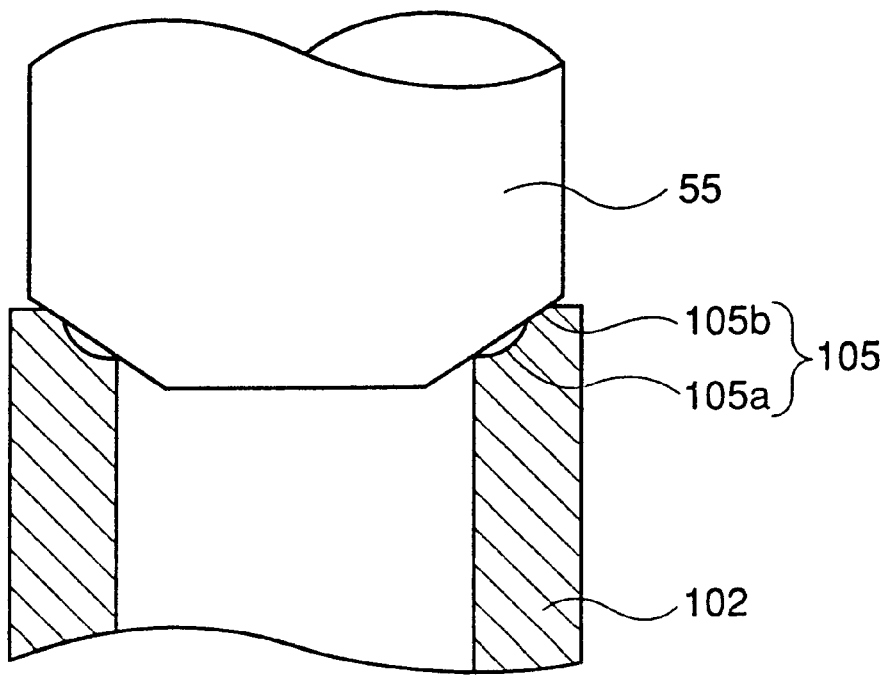

The concave lead-in thread 105 of the intermediate product 101 for the nut 1 according to this embodiment can be readily formed through a press molding step by first molding the concave bent portion 105*a* with a punch 54 shown in FIG. 6A and thereafter molding the linear tapered portion 105*b* with a punch 55 shown in FIG. 6B, for example.

While the nut 1 according to this embodiment has a structure obtained by applying the present invention to a full screw type hopper feed tee nut, the present invention is also applicable to a concave lead-in shape of a nut, such as a standard hexagon nut, other than the tee nut for similarly enabling internal threading causing no cross-thread by working with a rolled tap, as a matter of course.

Further, the shaft portions 2 and 101 of the nut 1 according to this embodiment and the intermediate product 101 therefor have step portions 6 and 106 having different inner and outer diameters, so that regions closer to the flange portion 3 with reference to the step portions 6 and 106 have shapes larger in inner and outer diameters than regions on ends opposite to the flange portion 3. The unthreaded intermediate product 101 for the nut 1 has such a step portion 106 so that a female screw threading shape defined in a standard such as JIS can be accurately formed. In the screw hole of, the shaft portion 102, only a prescribed region, including the concave lead-in 105, of a region slated for internal threading can be worked in necessary accuracy while the remaining region can be slightly larger in inner diameter to attain allowance in working accuracy. It can be said that formation of the step portion 106 is also effective for working the concave lead-in 5 and 105 according to this embodiment in high accuracy.

(Second Embodiment)

The structure of a nut 11 according to a second embodiment of the present invention is now described with reference to FIGS. 7A to 8B. Referring to FIGS. 7A to 8B, components similar to those of the nut 1 according to the first embodiment are denoted by the same reference numerals, and redundant description is not repeated.

Figure 7A:
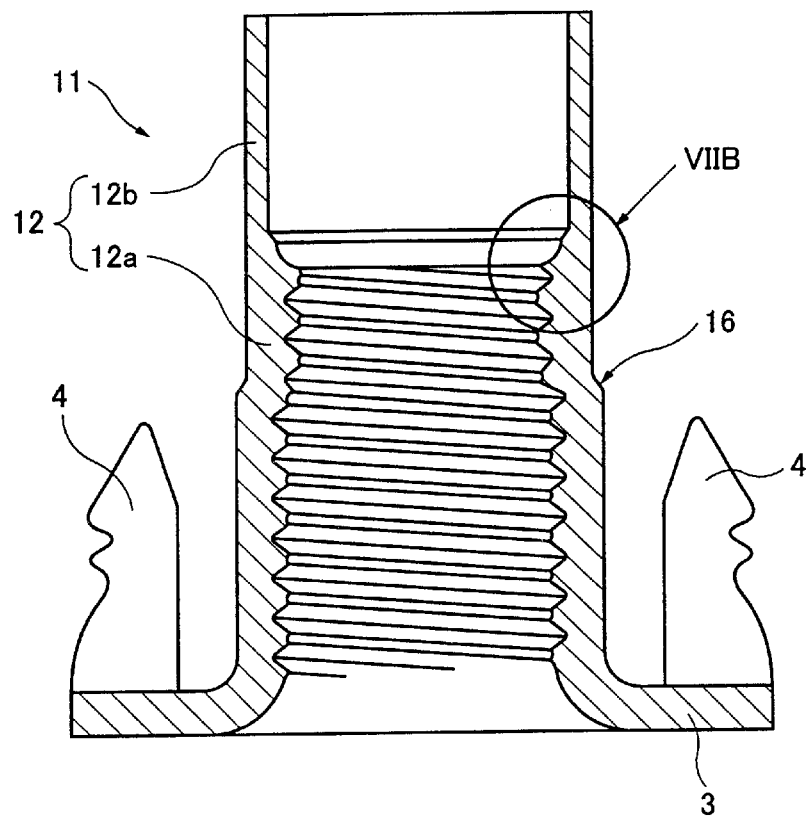
FIG. 7A illustrates a central longitudinal section of a nut according to a second embodiment of the present invention.
Figure 7B:
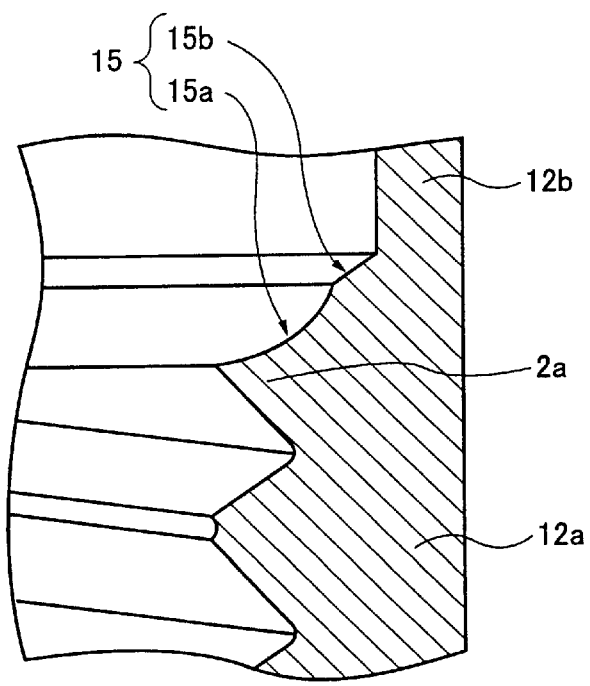
FIG. 7B is a partially enlarged sectional view showing a part enclosed with a circle VIIB in FIG. 7A in an enlarged manner.

In this embodiment, the present invention is applied to the so-called rivet type tee nut already proposed by the inventor in U.S. Pat. No. 5,348,432. As shown in FIG. 7A, a hollow cylindrical shaft portion 12 of the nut 11 according to this embodiment includes a female screw threading forming portion 12*a* as well as a predeterminate caulked or caulkable portion 12*b* having a smaller thickness, dissimilarly to the nut 1 according to the first embodiment. The predeterminate caulked portion 12*b* has an inner diameter larger than that of the female screw threading forming portion 12*a* and an outer diameter substantially identical to that of the female screw threading forming portion 12*a*. As shown in FIG. 7B, the nut 11 is provided on an end portion of the female screw threading forming portion 12*a* adjacent to the predeterminate caulked portion 12*b* with a concave lead-in 15, which is formed by a substantially arcuate concave bent portion 15*a* and a linear tapered portion 15*b* in an arbitrary longitudinal section including the central axis of the shaft portion 12, similarly to the first embodiment.

Figure 8A:
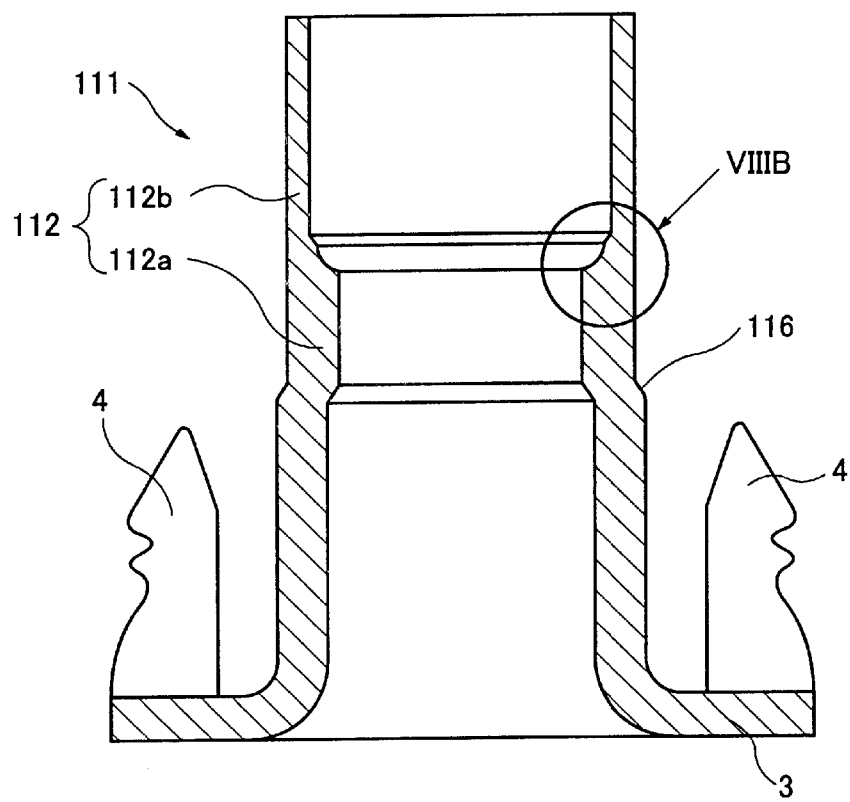
FIG. 8A illustrates a central longitudinal section of an unthreaded intermediate product for the nut according to the second embodiment of the present invention.
Figure 8B:
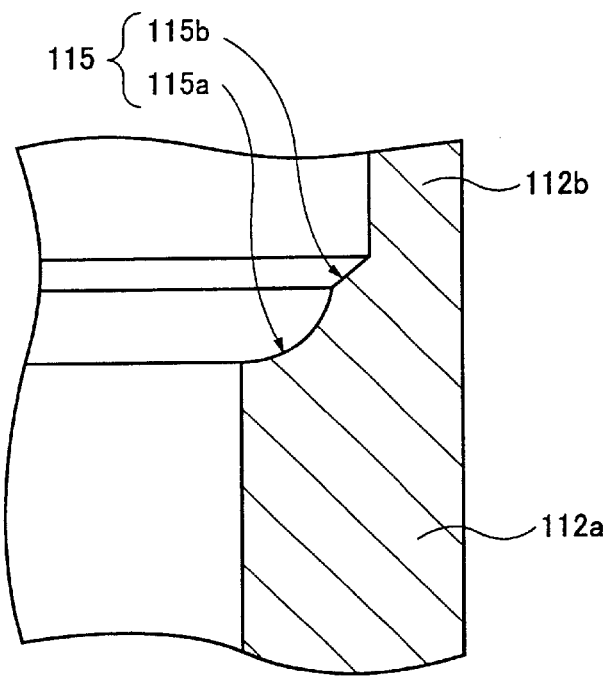
FIG. 8B is a partially enlarged sectional view showing a part enclosed with a circle VIIB in FIG. 8A in an enlarged manner.

For the nut 11 having the aforementioned structure, a rolled tap 53 is screwed into an unthreaded intermediate product 111 from the side of the upper end of the nut 11, i.e., the side of the concave lead-in 15 as shown in FIG. 8A, for forming a female screw threading. As shown in FIG. 8B, a concave lead-in 115 of the intermediate product 111 for the nut 11 includes a substantially arcuate concave bent portion 115*a* provided on the inner peripheral side of the upper end of a hollow cylindrical shaft portion 112 and a linear tapered portion 115*b* continuous with the concave bent portion 115*a* on the outer peripheral side in an arbitrary longitudinal section including the central axis of the shaft portion 112.

With the concave lead-in 115 having the aforementioned shape, the intermediate product 111 is internally threaded with the rolled tap 53 in a mode basically similar to that described with reference to FIGS. 3A, 3B and 4 in the first embodiment. The concave bent portion 115*a* of the concave lead-in 115 of the intermediate product 111 is worked into a predetermined proper shape so that the crest of a thread of the female screw threading, adjacent to the concave lead-in 15 has no concave groove when the intermediate product 111 is completely internally threaded with the rolled tap 53. Consequently, when a bolt engages with the nut 11 from the side of the concave lead-in 15, the nut 11 is prevented from cross-thread in a similar manner to the above description of the first embodiment with reference to FIGS. 5A and 5B.

The intermediate product 111 for the nut 11 according to this embodiment can be relatively readily formed without remarkably increasing the manufacturing cost by including a molding step with a punch described in relation to the first embodiment with reference to FIGS. 6A and 6B in the process of a progressive press molding step already proposed by the inventor in U.S. Pat. No. 5,503,596.

The shaft portions 12 and 112 of the nut 11 according to this embodiment and the intermediate product 111 therefor are provided with step portions 16 and 116 having different inner and outer diameters, so that regions closer to the flange portion 3 with reference to the step portions 6 and 106 have shapes larger in inner and outer diameters than regions on ends opposite to the flange portion 3. The object and effect of the step portions 16 and 116 are similar to those of the step portions 6 and 106 in the first embodiment, while it can be said that the step portions 16 and 116 are more effective for the nut 11 according to this embodiment requiring higher working accuracy due to the predeterminate caulked portion 12*b* having a relatively small thickness.

(Third Embodiment)

The structure of a nut 21 according to a third embodiment of the present invention is now described with reference to FIGS. 9A to 10B. Referring to FIGS. 9A to 10B, components similar to those of the nut 1 according to the first embodiment are denoted by the same reference numerals, and redundant description is not repeated.

Figure 9A:
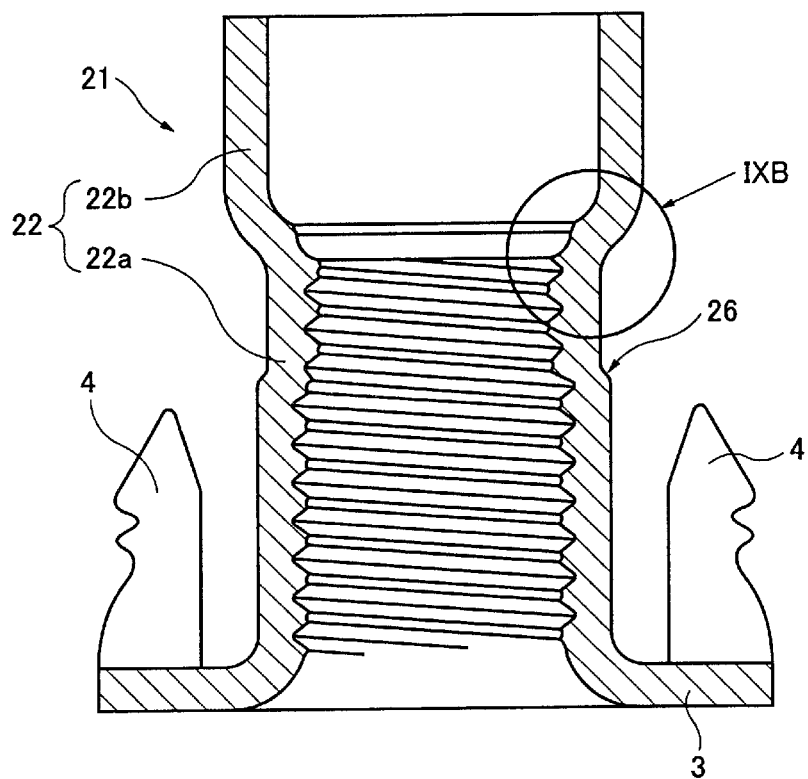
FIG. 9A illustrates a central longitudinal section of a nut according to a third embodiment of the present invention.
Figure 9B:
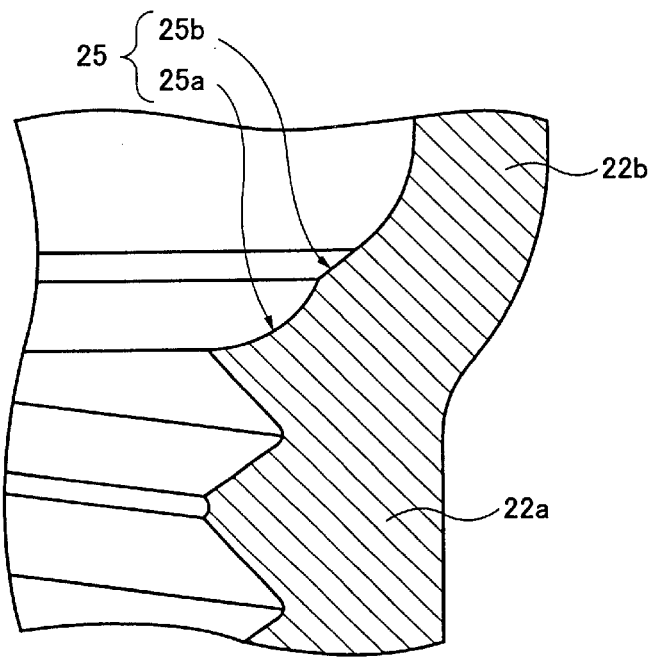
FIG. 9B is a partially enlarged sectional view showing a part enclosed with a circle IXB in FIG. 9A in an enlarged manner.

In this embodiment, the present invention is applied to a nut described in U.S. Pat. No. 5,618,144. While the nut 21 according to this embodiment is the so-called rivet type tee nut similarly to the nut 11 according to the second embodiment, the shape of a predeterminate caulked portion 22*b* thereof is different from that of the nut 11. As shown in FIG. 9A, the predeterminate caulked portion 22*b* of the nut 21 according to this embodiment has an inner diameter larger than that of a female screw threading forming portion 22*a* and an outer diameter larger than that of the female screw threading forming portion 22*a*. As shown in FIG. 9B, the nut 21 is provided on an end of the female screw threading forming portion 22a adjacent to the. predeterminate caulked portion 22b with a concave lead-in 25, which is formed by a substantially arcuate concave bent portion 25a and a linear tapered portion 25b in an arbitrary longitudinal section including the central axis of a shaft portion 22, similarly to the first and second embodiments.

Figure 10A:
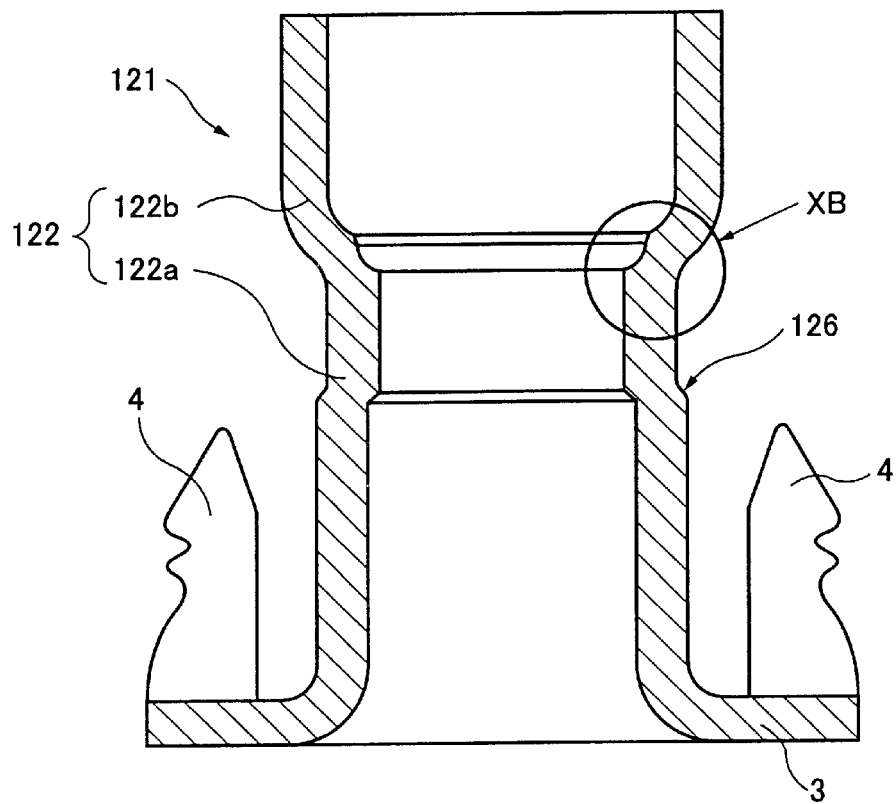
FIG. 10A illustrates a central longitudinal section of an unthreaded intermediate product for the nut according to the third embodiment of the present invention.
Figure 10B:
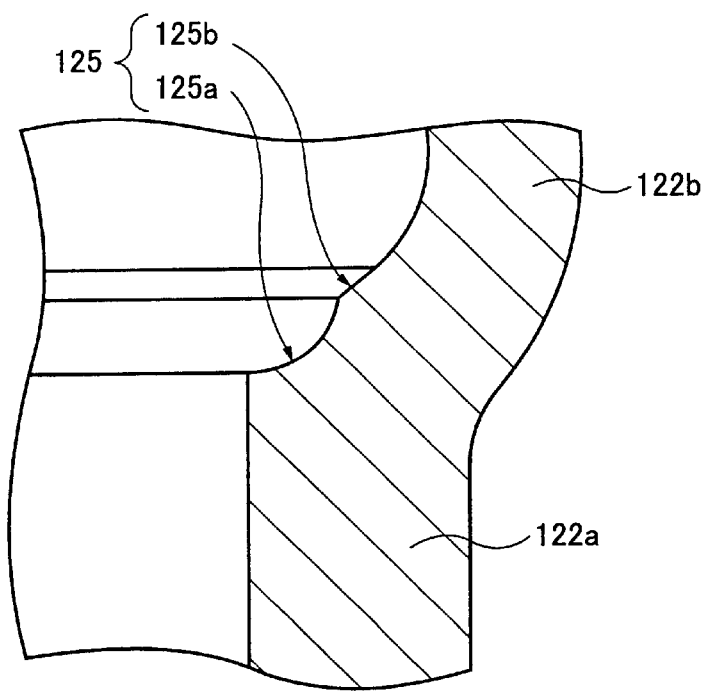
FIG. 10B is a partially enlarged sectional view showing a part enclosed with a circle XB in FIG. 10A in an enlarged manner.

For the nut 21 having the aforementioned structure, a rolled tap 53 is screwed into an unthreaded intermediate product 121 from the side of the upper end of the nut 21, i.e., the side of the concave lead-in 25 as shown in FIG. 10A, for forming a female screw threading. A lead thread 125 of the intermediate product 121 for the nut 21 includes a substantially arcuate concave bent portion 125a provided on the inner peripheral side of the upper end of a hollow cylindrical shaft portion 122 and a linear tapered portion 125b continuous with the concave bent portion 125a on the outer peripheral side in an arbitrary longitudinal section including the central axis of the shaft portion 122, as shown in FIG. 10B.

With the concave lead-in 125 having the aforementioned shape, the intermediate product 121 is internally threaded with the rolled tap 53 also in a mode basically similar to that described with reference to FIGS. 3A, 3B and 4 in the first embodiment. The concave bent portion 125a of the concave lead-in 125 of the intermediate product 121 is worked into a predetermined proper shape so that the crest of a first 2B thread of the female screw threading adjacent to the concave lead-in 25 has no concave groove when the intermediate product 121 is completely internally threaded with the rolled tap 53.

Consequently, when a bolt engages with the nut 21 from the side of the lead thread 25, the nut 21 is prevented from cross-thread in a similar manner to the above description of the first embodiment with reference to FIGS. 5A and 5B.

The shaft portions 22 and 122 of the nut 21 according to this embodiment and the intermediate product 121 therefor are also provided with step portions 26 and 126 having different inner and outer diameters, so that regions closer to a flange portion 3 with reference to the step portions 26 and 126 have shapes larger in inner and outer diameters than regions on ends opposite to the flange portion 3. The object and effect of the step portions 26 and 126 are similar to those of the step portions 6 and 106 in the first embodiment or the step portions 16 and 116 in the second embodiment.

(Fourth Embodiment)

The structure of an intermediate product 141 for a nut 41 according to a fourth embodiment of the present invention and that of the nut 41 prepared by internally threading the intermediate product 141 with a rolled tap are now described with reference to FIGS. 11A and 11B.

Figure 11A:
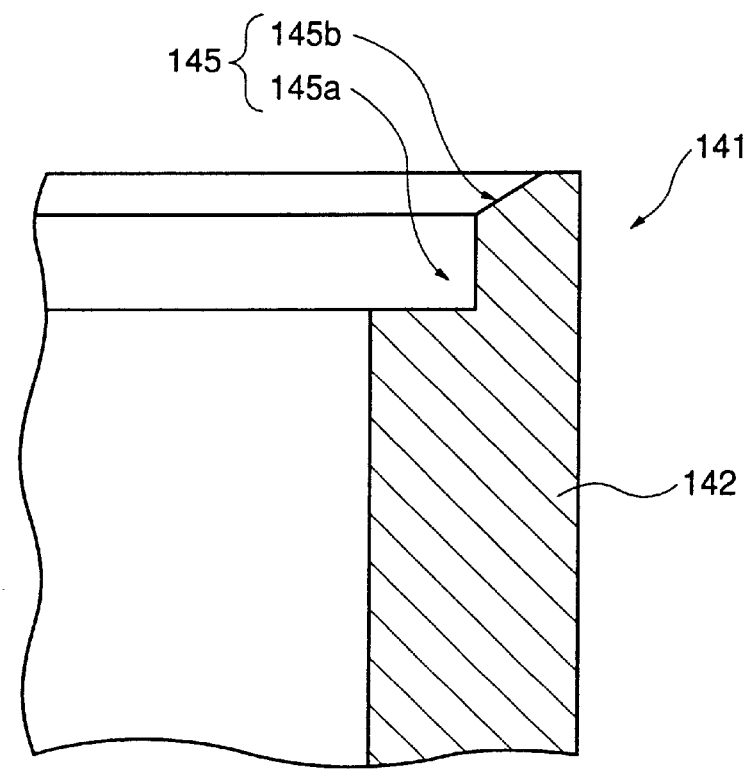
FIG. 11A is a partially enlarged sectional view showing a part, close to a concave lead-in, in a central longitudinal section of an unthreaded intermediate product for a nut according to a fourth embodiment of the present invention in an enlarged manner.

As shown in FIG. 11A, a concave lead-in 145 provided in the vicinity of the forward end of a shaft portion 142 of the intermediate product 141 for the nut 41 according to this embodiment includes a concave depressed portion 145a having a bottom substantially horizontal along the overall periphery and a peripheral side perpendicular thereto and a linear tapered portion 145b continuous with the concave depressed portion 145a on the outer peripheral side. A female screw threading is formed in a screw hole of the intermediate product 141 with a rolled tap, to obtain the nut 41 according to this embodiment having the structure shown in FIG. 11B. A concave lead-in 45 in the vicinity of the forward end of a shaft portion 42 of the nut 41 according to this embodiment includes a concave depressed portion 45a having a bottom substantially horizontal along the overall periphery and a peripheral side perpendicular thereto and a linear tapered portion 45b continuous with the concave depressed portion 45a on the outer peripheral side.

Figure 11B:
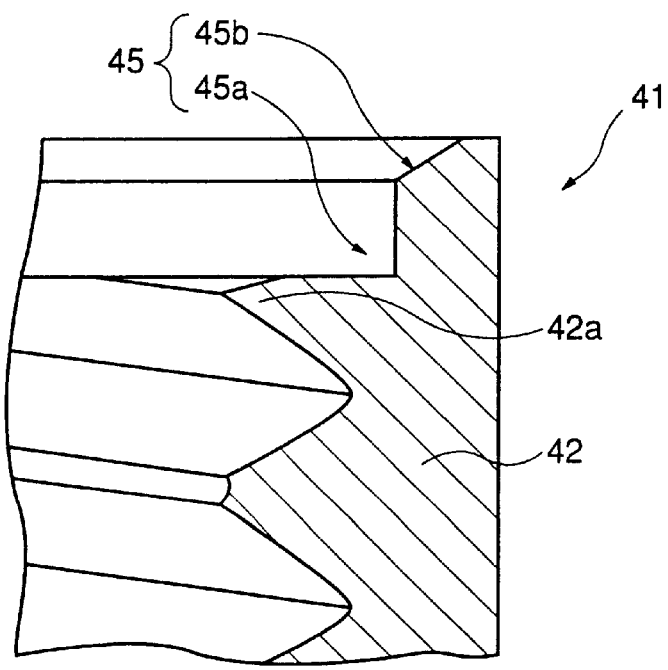
FIG. 11B is a partially enlarged sectional view showing the part close to the concave lead-in of the intermediate product shown in FIG. 11A formed with a female screw threading in a screw hole with a rolled tap.

Also when forming the concave depressed portion 145a of the lead thread 145 of the intermediate product 141 so that a corner part is substantially right-angled, the crest of a first thread 42a, adjacent to the concave lead-in 45, of the female screw threading formed with the rolled tap can be convexly formed to include no concave groove, as shown in FIG. 11B. Thus, it is possible to prevent cross-threading caused by a thread of a bolt hitting against a concave groove of the crest of the threading of the nut 41. Further, the female screw threading can be worked without damaging still another function of the countersink facilitating discharge of chips resulting from internal threading with the tap.

(Fifth Embodiment)

The structure of an intermediate product 151 for a nut 51 according to a fifth embodiment of the present invention and that of the nut 51 prepared by internally threading the intermediate product 151 with a rolled tap are now described with reference to FIGS. 12A and 12B. This embodiment corresponds to a nut prepared by replacing the concave lead-in of the rivet type nut according to the second embodiment shown in FIGS. 7A to 8B with a concave lead-in having a shape similar to that in the fourth embodiment.

Figure 12A:
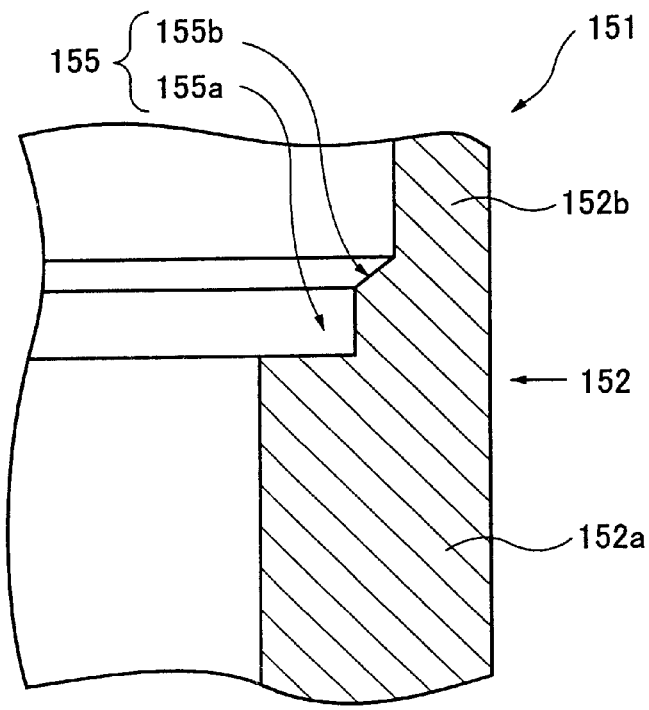
FIG. 12A is a partially enlarged sectional view showing a part, close to a concave lead-in, in a central longitudinal section of an unthreaded intermediate product for a nut according to a fifth embodiment of the present invention in an enlarged manner.

As shown in FIG. 12A, a concave lead-in 155 defining an end, closer to a portion 152b slated for caulking, of a portion 152a slated for formation of a female screw threading in a shaft portion 152 of the intermediate product 151 for the nut 51 according to the present invention includes a concave depressed portion 155a having a bottom substantially horizontal along the overall periphery and a peripheral side perpendicular thereto and a linear tapered portion 155b continuous with the concave depressed portion 155a on the outer peripheral side. A female screw threading is formed in a screw hole of the intermediate product 151 with a rolled tap, to obtain the nut 51 according to this embodiment having the structure shown in FIG. 12B. A concave lead-in 55 of the nut 51 according to this embodiment includes a concave depressed portion 55a having a bottom substantially horizontal along the overall periphery and a peripheral side perpendicular thereto and a linear tapered portion 55b continuous with the concave depressed portion 55a on the outer peripheral side.

Figure 12B:
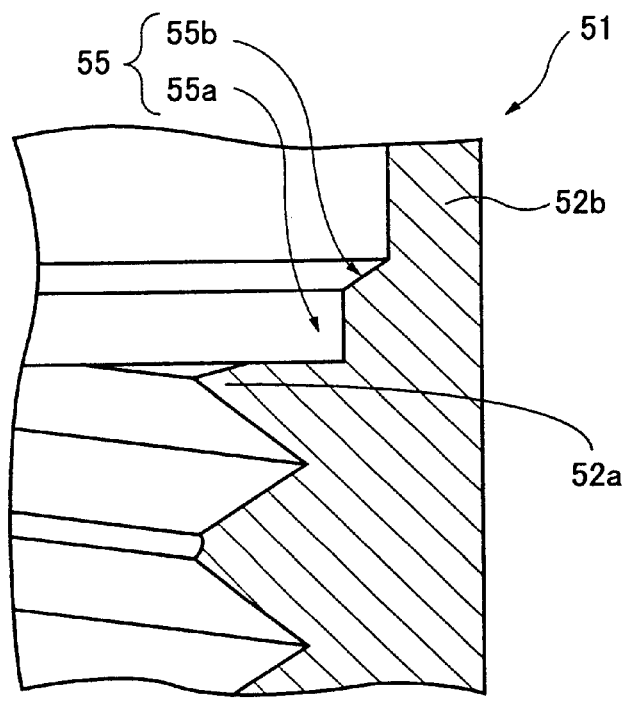
FIG. 12B is a partially enlarged sectional view showing the part close to the concave lead-in of the intermediate product shown in FIG. 12A formed with a female screw threading in a screw hole with a rolled tap.
Figure 13A:
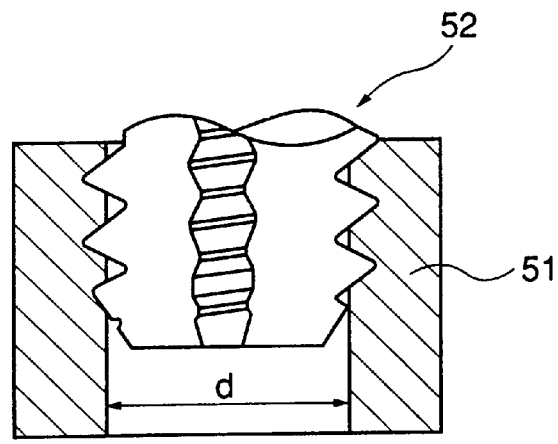
FIG. 13A is an explanatory diagram showing internal threading with a cutting tap.
Figure 13B:
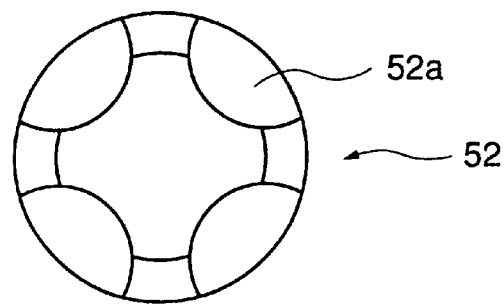
FIG. 13B is an explanatory diagram showing the shape of an insert of the cutting tap in plane.
Figure 14A:
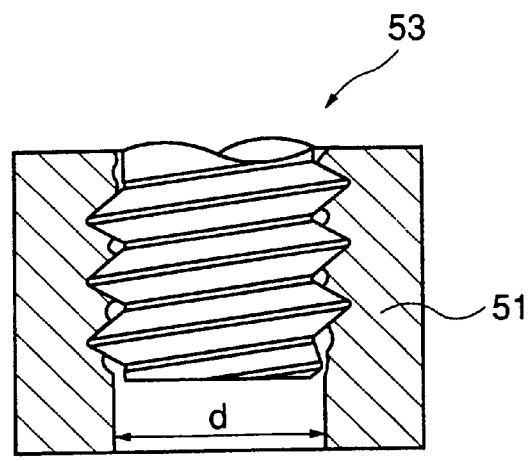
FIG. 14A is an explanatory diagram showing internal threading with a rolled tap.
Figure 14B:
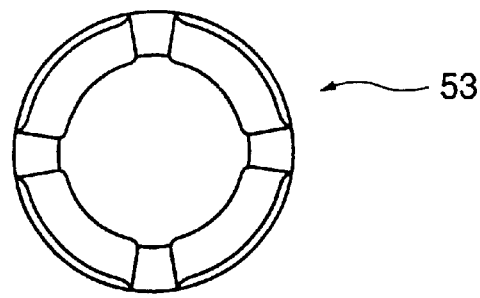
FIG. 14B is an explanatory diagram showing the shape of an insert of the rolled tap in plane.

Also when forming the concave depressed portion 155a of the concave lead-in 155 of the intermediate product 151 so that a corner portion is substantially right-angled, the crest of a first thread 52a, adjacent to the concave lead-in 55, of the female screw threading formed with the rolled tap can be convexly formed to include no concave groove, as shown in FIG. 12B. Thus, it is possible to prevent cross-threading caused by a thread of a bolt hitting against a concave groove of the crest of the threading of the nut 51. Further, the female screw, can be worked without damaging the function of the countersink facilitating discharge of chips resulting from internal threading with the tap.

While the concave lead-in has the linear tapered portion continuous only on the outer peripheral side of the concavely depressed portion in each of the aforementioned embodiments, a linear tapered portion continuous with the inner peripheral side of the concave depressed portion may be further provided on the inner peripheral end of the concave lead-in.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A nut consisting of an integral metal material, and having:
   a first end surface defining a first end of said nut;
   a hole that extends axially along an axis of said nut and substantially perpendicularly to said first end surface in said nut, and that opens at a hole opening at said first end of said nut;
   a female threading formed on at least a portion of an inner periphery of said nut bounding said hole; and
   a concave lead-in adjoining said female threading between said female threading and said hole opening;
   wherein said female threading includes, on a longitudinal section plane extending along said axis of said nut, a first thread that includes a first thread crest between two first thread flanks and that adjoins said concave lead-in in said hole, and at least one subsequent thread that includes at least one subsequent thread crest between two subsequent thread flanks and that adjoins said first thread in said hole;
   wherein said first thread and said at least one subsequent thread have, on said longitudinal section plane, such characteristics as result from said first thread and said at least one subsequent thread having been formed by a rolled tap;
   wherein said characteristics include said at least one subsequent thread crest having a concave groove therealong between said two subsequent thread flanks on said longitudinal section plane; and
   wherein said concave lead-in comprises a concave shaped portion having a concave shape on said longitudinal section plane and a linear tapered portion that has a linear tapering shape on said longitudinal section plane and that continuously adjoins said concave shaped portion.

2. The nut according to claim 1, wherein said linear tapered portion is located relatively outwardly and farther from said first thread, and said concave shaped portion is located relatively inwardly and closer to said first thread.

3. A nut consisting of an integral metal material, and having:
   a first end surface defining a first end of said nut;
   hole that extends axially along an axis of said nut and substantially perpendicularly to said first end surface in said nut, and that opens at a hole opening at said first end of said nut;
   a female threading formed on at least a portion of an inner periphery of said nut bounding said hole; and
   a concave lead-in adjoining said female threading between said female threading and said hole opening;
   wherein said female threading includes, on a longitudinal section plane extending along said axis of said nut, a first thread that includes a first thread crest between two first thread flanks and that adjoins said concave lead-in in said hole, and at least one subsequent thread that includes at least one subsequent thread crest between two subsequent thread flanks and that adjoins said first thread in said hole;
   wherein said concave lead-in comprises a depression with a depressed shape on said longitudinal section plane;
   wherein said depressed shape includes a first annular wall on a plane that is perpendicular to said axis of said nut and a second cylindrical wall that is cylindrically concentric about said axis of said nut;
   wherein said first thread and said at least one subsequent thread have, on said longitudinal section plane, such characteristics as result from said first thread and said at least one subsequent thread having been formed by a rolled tap; and
   wherein said characteristics include said at least one subsequent thread crest having a concave groove therealong between said two subsequent thread flanks on said longitudinal section plane.

4. A nut consisting of an integral metal material, and comprising:
   a hollow cylindrical shaft with a first end surface defining a first end of said nut;
   a flange extending radially outwardly from a second end of said hollow cylindrical shaft defining a second end of said nut opposite said first end;
   a hole that extends in said hollow cylindrical shaft axially along an axis of said nut and substantially perpendicularly to said first end surface, and that opens at a hole opening of said hollow cylindrical shaft at said first end of said nut;
   a female threading formed on at least a portion of an inner periphery of said nut bounding said hole; and
   a concave lead-in adjoining said female threading between said female threading and said hole opening;
   wherein said female threading includes, on a longitudinal section plane extending along said axis of said nut, a first thread that includes a first thread crest between two first thread flanks and that adjoins said concave lead-in in said hole, and at least one subsequent thread that includes at least one subsequent thread crest between two subsequent thread flanks and that adjoins said first thread in said hole;
   wherein said concave lead-in comprises a concave depression on said longitudinal section plane;
   wherein said first thread and said at least one subsequent thread have, on said longitudinal section plane, such characteristics as result from said first thread and said at least one subsequent thread having been formed by a rolled tap;
   wherein said characteristics include said at least one subsequent thread crest having a concave groove therealong between said two subsequent thread flanks on said longitudinal section plane;
   wherein said cylindrical shaft includes a first shaft portion relatively closer to said first end, a second shaft portion relatively closer to said second end, and a step portion interposed between and joining said first shaft portion and said second shaft portion at a location radially outward around said female threading;
   wherein said first shaft portion has a first inner diameter and a first outer diameter; and
   wherein said second shaft portion has a second inner diameter larger than said first inner diameter, and a second outer diameter larger than said first outer diameter.

5. A nut consisting of an integral metal material, and comprising:
   a hollow cylindrical shaft with a first end surface defining a first end of said nut;
   a flange extending radially outwardly from a second end of said hollow cylindrical shaft defining a second end of said nut opposite said first end;
   a hole that extends in said hollow cylindrical shaft axially along an axis of said nut and substantially perpendicularly to said first end surface, and that opens at a hole opening of said hollow cylindrical shaft at said first end of said nut;

a female threading formed on at least a portion of an inner periphery of said nut bounding said hole; and a concave lead-in adjoining said female threading between said female threading and said hole opening;

wherein said female threading includes, on a longitudinal section plane extending along said axis of said nut, a first thread that includes a first thread crest between two first thread flanks and that adjoins said concave lead-in in said hole, and at least one subsequent thread that includes at least one subsequent thread crest between two subsequent thread flanks and that adjoins said first thread in said hole;

wherein said concave lead-in comprises a concave depression on said longitudinal section plane;

wherein said first thread and said at least one subsequent thread have, on said longitudinal section plane, such characteristics as result from said first thread and said at least one subsequent thread having been formed by a rolled tap;

wherein said characteristics include said at least one subsequent thread crest having a concave groove therealong between said two subsequent thread flanks on said longitudinal section plane;

wherein said hollow shaft includes a threaded portion in which said female threading is formed, and a caulkable portion that is adapted to be caulked and that adjoins and extends from said threaded portion to said first end;

wherein said caulkable portion does not have a female threading formed therein, and has a third inner diameter larger than a first inner diameter of said threaded portion; and wherein said concave lead-in is located at an end of said threaded portion adjoining said caulkable portion, and said concave depression forms a transition from said female threading to a portion of said inner periphery of said nut in said caulkable portion that does not have a female threading formed therein.

6. The nut according to claim 5, wherein said caulkable portion has a wall thickness less than a wall thickness of said threaded portion.

7. The nut according to claim 5, wherein said caulkable portion has an outer diameter larger than an outer diameter of said threaded portion.

8. The nut according to claim 5, wherein said threaded portion includes a first shaft portion relatively closer to said first end, a second shaft portion relatively closer to said second end, and a step portion interposed between and joining said first shaft portion and said second shaft portion, wherein said first shaft portion has said first inner diameter and a first outer diameter, and wherein said second shaft portion has a second inner diameter larger than said first inner diameter, and a second outer diameter larger than said first outer diameter.

* * * * *

UNITED STATES PATENT AND TRADEMARK OFFICE
CERTIFICATE OF CORRECTION

PATENT NO. : 6,439,818 B1
DATED : August 27, 2002
INVENTOR(S) : Nagayama

It is certified that error appears in the above-identified patent and that said Letters Patent is hereby corrected as shown below:

Title page,
Item [57], ABSTRACT,
Line 2, after "screw threading;", delete "screw thread";
Line 4, after "the", replace "nu." by -- nut. --.

Column 1,
Line 58, before "area", replace "detailed" by -- detail --.

Column 3,
Line 5, after "shape", insert -- , --.

Column 4,
Line 15, after "circle", replace "1B" by -- IB --.

Column 5,
Line 58, after "bent", insert -- or curved --;

Column 6,
Line 7, after "peripheral", replace "sides" by -- side --;
Line 16, before "the", replace "FIGS. 4," by -- FIG. 4, --;
Line 17, after "periphery", replace "from and or roots 26" by -- P --;
Line 19, after "screw", insert -- troughs or roots 2b --;
Line 27, after "The", replace "lead thread" by -- concave lead-in --;
Line 31, after "lead-in" insert -- 5 --;
Line 57, after "first", replace "troush" by -- trough --;
Line 60, before "Even", replace "crust." by -- crest. --.

Column 7,
Line 37, after "of", delete ",".

Column 9,
Line 2, after "the", delete ".";
Line 12, after "A", replace "lead thread" by -- concave lead-in --;
Line 26, after "first", delete "2B";
Line 27, after "thread" insert -- 2a --.

UNITED STATES PATENT AND TRADEMARK OFFICE
CERTIFICATE OF CORRECTION

PATENT NO.    : 6,439,818 B1
DATED         : August 27, 2002
INVENTOR(S)   : Nagayama It is certified that error appears in the above-identified patent and that said Letters Patent is hereby corrected as shown below:

<u>Column 10,</u>
Line 2, after "the" (1$^{st}$ occurrence), replace "lead thread" by -- concave lead-in --.

<u>Column 11,</u>
Line 45, before "hole", insert -- a --.

Signed and Sealed this

Eleventh Day of March, 2003

JAMES E. ROGAN
*Director of the United States Patent and Trademark Office*